United States Patent
Sharaga et al.

(10) Patent No.: US 8,566,593 B2
(45) Date of Patent: Oct. 22, 2013

(54) METHOD AND APPARATUS OF DERIVING SECURITY KEY(S)

(75) Inventors: Avishay Sharaga, Beit Nehemya (IL); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 12/643,675

(22) Filed: Dec. 21, 2009

(65) Prior Publication Data

US 2011/0004760 A1 Jan. 6, 2011

Related U.S. Application Data

(60) Provisional application No. 61/223,360, filed on Jul. 6, 2009.

(51) Int. Cl.
*H04L 9/32* (2006.01)

(52) U.S. Cl.
USPC ........................................................ 713/171

(58) Field of Classification Search
USPC ........................................................ 713/171
See application file for complete search history.

(56) References Cited

U.S. PATENT DOCUMENTS

| | | | |
|---|---|---|---|
| 7,546,459 B2 * | 6/2009 | Robles et al. | 713/168 |
| 8,171,529 B2 * | 5/2012 | Dadu et al. | 726/4 |
| 2004/0243801 A1 | 12/2004 | Chen et al. | |
| 2005/0266798 A1 | 12/2005 | Moloney et al. | |
| 2006/0107050 A1 * | 5/2006 | Shih | 713/171 |
| 2007/0097934 A1 | 5/2007 | Walker et al. | |
| 2007/0112967 A1 * | 5/2007 | Lee et al. | 709/229 |
| 2010/0058070 A1 * | 3/2010 | Garay et al. | 713/190 |
| 2012/0008775 A1 * | 1/2012 | Natarajan | 380/247 |

FOREIGN PATENT DOCUMENTS

| | | |
|---|---|---|
| EP | 1887758 A2 | 2/2008 |
| JP | 2005339247 A | 8/2005 |
| JP | 2004230566 A | 5/2013 |
| WO | 2011/005644 A2 | 1/2011 |
| WO | 2011/005644 A3 | 4/2011 |

OTHER PUBLICATIONS

International Preliminary Report on Patentability Received for PCT Patent No. PCT/US2010/040731, Issued on Jan. 10, 2012, 4 pages.
International Search Report and Written Opinion Received for PCT Patent Application No. PCT/US2010/040731, Mailed on Feb. 1, 2011, 8 pages.
Office Action received for Russian Patent Application No. 2012103894, mailed on Jan. 22, 2013, 6 Pages of Office Action and 4 Pages of English Translation.
Office Action received for GB Patent Application No. 1201409.8, mailed on Dec. 24, 2012, 2 Pages.
Office Action received for Korean Patent Application No. 10-2012-7002860, mailed on May 27, 2013, 7 pages of Office Action including 3 pages of English Translation.
Office Action received for Japanese Patent Application No. 2012-519595, mailed on May 28, 2013, 7 pages of Office Action including 4 pages of English Translation.

* cited by examiner

*Primary Examiner* — Kambiz Zand
*Assistant Examiner* — Abiy Getachew
(74) *Attorney, Agent, or Firm* — Cool Patent, P.C.; Kenneth J. Cool; Joseph P. Curtin

(57) ABSTRACT

A method, apparatus and a wireless communication system to derive security key(s) over an air link in a secure manner by sending by a mobile station over the air a single direction permutation of a mobile station ID, establishing keys with the base station and sending the mobile station real ID in a secure manner.

27 Claims, 2 Drawing Sheets

METHOD AND APPARATUS OF DERIVING SECURITY KEY(S)

PRIOR APPLICATION DATA

This application claims priority from U.S. provisional application No. 61/223,360, filed Jul. 6, 2009, incorporated by reference herein in its entirety.

BACKGROUND OF THE INVENTION

A wireless wide area network (WWAN) may be operated according to an IEEE 801.16 standard which may also be referred as a WiMAX. The WiMAX network may transport data between for example, a base station (BS) and a mobile station (MS) in a secure manner.

According to the IEEE 802.1x standard, in order to establish a secure link between the BS and the MS, the BS may request the MS to send its device identification (ID) over an air link in an unsecure manner in order to derive security keys to protect the device ID and to establish the secure link using the keys. However, sending the device ID over the air link in an unsecure manner may expose the MS to malicious attracts.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
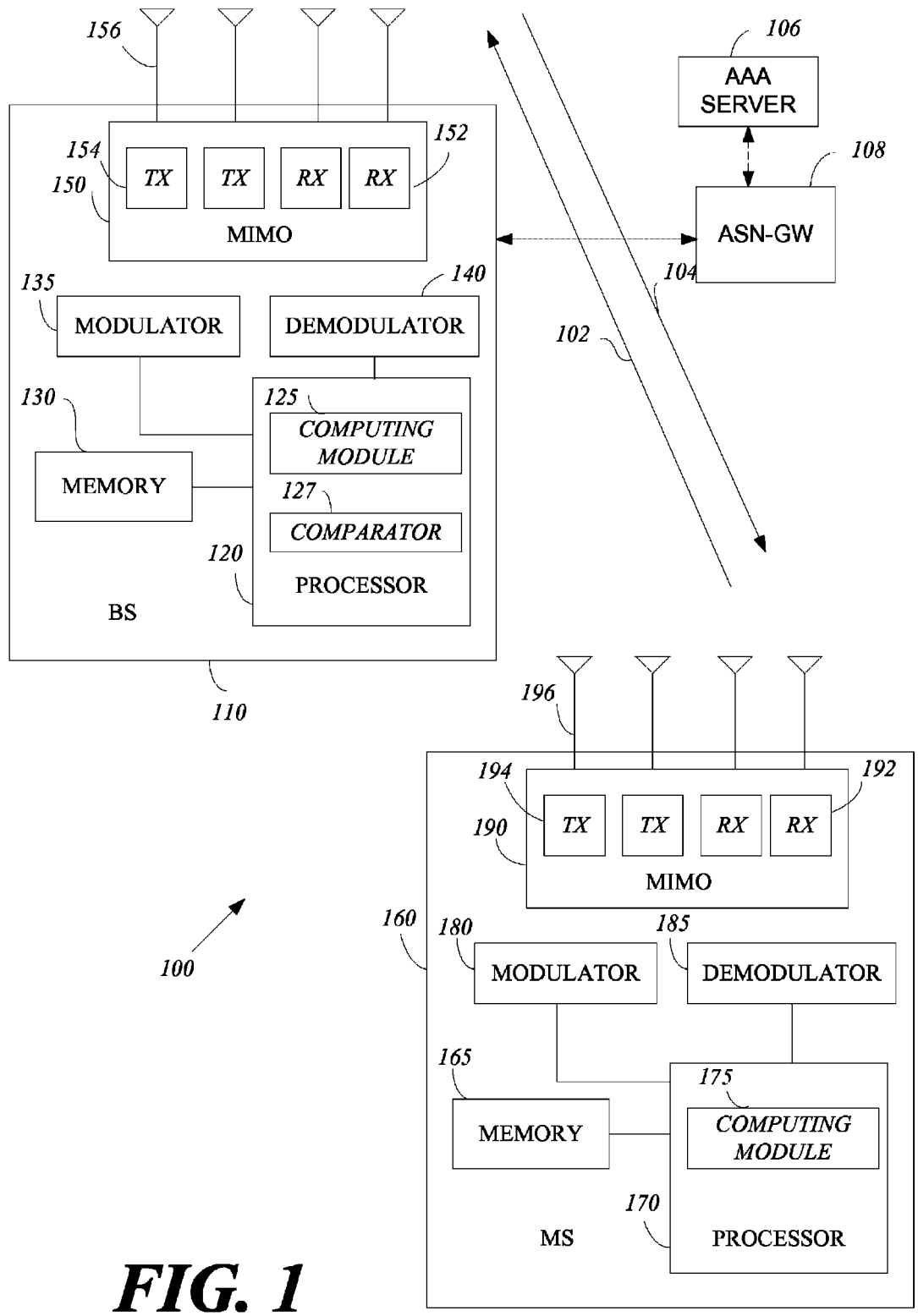
FIG. 1 is an illustration of a portion of a wireless communication system according to some exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN) which also may be referred as WiFi, wireless metropolitan area network (WMAN) which also may be referred as WiMAX, a wireless personal area network (WPAN) such as, for example Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium such as for example a memory circuit and/or an article which may store an instruction and/or a set of instructions that, if executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel and/or an air link may be a physical transfer medium. The physical transfer medium may be used to transfer signals such as, for example, informative data signals, training signals, pilot signals, sub-carriers signals, preamble signals and the like, that may be modulated by one or more modulation scheme. Furthermore, the channel and/or the air link may be a combination of the physical transfer medium, components of the transmitter and/or the receiver, for example path loss, noise, interference or the like. It should be understood to the skilled artisan that embodiments of the invention may operate with many types of signals, some of which specified herein, and the invention is in no way limited to these signals.

According to exemplary embodiments of the invention a mobile station may send over the air a single direction permutation of a real station ID which has the same size of the station ID and by that may allow the key to be bind to the real station ID without exposing it. Once keys agreement has been based on the permutation of the real station ID has been established the real station ID may be sent in a protected by those keys and the base station may re-compute the permutation of the real station ID to certified that the keys have been calculated from the real station ID, although it should be understood that the scope of the present invention is not limited in this respect.

In one embodiment, a method, device, and system may perform key agreement over an air link of a wireless communication system. For example, at a mobile station, a first message from may be received from a base station, including a random NONCE wherein the random NONCE is a number or bit string used only once in a message for a security purpose. A permutation of a mobile station identification (MSID*) may be computed. A second message may be sent including a mobile station random NONCE, the base station random NONCE and a first integrity check value (ICV). A third message may be received at said mobile station including a mobile station NONCE, the base station random NONCE and a second ICV. At a mobile station a third message may be received including a mobile station NONCE, the base station random NONCE and a second ICV if the base station verified the first ICV. The second ICV may be verified. A fourth message including mobile station identification in a secure link may be sent. Other message sequences, and messaging with other contents, may be used according to embodiments of the invention.

Turning first to FIG. 1 an illustration of a portion of a wireless communication system 100 according to exemplary embodiment of the invention is shown. Although the scope of the present invention is not limited to this embodiment wireless communication system 100, for example a WiMAX system or the like may include a base station (BS) 110, a mobile station (MS) 120, an uplink 102 and a downlink 104.

For example BS 110 may include a processor 120, a memory 130, a modulator 135, a demodulator 140, a multiple-input-multiple-output (MIMO) transmitters receivers system 150 and a plurality of antennas 156. The MS 160 may include a processor 170, a memory 165, a modulator 180, a demodulator 185, a multiple-input-multiple-output (MIMO) transmitters receivers system 190 and a plurality of antennas 196. Furthermore, processor 120 may include a computing module 125, a comparator 127 and processor 170 may include a computing module 175. MIMO 150 may include at least two transmitters (TX) 154 and at least two receivers (RX) 152. MIMO 190 may include at least two transmitters (TX) 194 and at least two receivers (RX) 192, although it should be understood that embodiments of the present invention are not limited to this example.

According to embodiments of the invention, processors 120 and 170 may include a MAC processor. The MAC processor may execute instructions related to IEEE 802.16 standard that may cause MS 160 and BS 110 to establish a communication over a secure link after agreement of security keys according to some security functions, if desired.

According to another embodiment of the invention, processors 120 and 170 may include a MAC processor. The MAC processor may execute instructions related to 3GPP and/or Long Term Evolution (LTE) standards that may cause MS 160 and BS 110 to establish a communication over a secure link after agreement of security keys according to some security functions, if desired.

According to exemplary embodiment of the invention, the security functions may provide subscribers with privacy, authentication, and confidentiality across wireless communication system 100, for example, an Advanced Air Interface (AAI) network, Long Term Evolution (LTE) or the like.

For example, the security functions may apply cryptographic transforms to MAC PDUs carried across connections between MS 160 for example, Advanced MS (AMS) and BS 110 for example, Advanced BS (ABS).

According to some exemplary embodiments of the invention, establishing of authentication of BS 110 and MS 160 may be done by Authentication, Authorization, and Accounting (AAA) server 106. For example, AAA server 106 may use an Extensible Authentication Protocol (EAP) for establishing the authentication, if desired. After establishing authentication MS 160 negotiate on key(s) agreement with BS 110 and/or with authenticator resides in an Access Service Network gateway (ASN-GW) 108 or the like. For example, BS 110 may send over downlink 104 a first message. MS 160 may receive the first message by at least one of MIMO 190 receivers (e.g. RX 192). The first message may be modulated according to an Orthogonal Frequency Division Multiple Access (OFDMA) modulation scheme and may include a random NONCE. With embodiments of the present invention, the random NONCE may be defined as a number or bit string used only once in a lifetime cycle of a key and/or authentication for a security purpose.

Demodulator 185 may demodulate the message. Computing module 175 may calculate a permutation of a mobile station identification (MSID*) from the random NONCE and may store the MSID* in memory 165, if desired. According to embodiments of the invention, *MSID may also be defined as the parameter needs permutation.

For example, computing module 175 may compute the MSID* according to MSID*=DOT16 KDF (MSID|BSID|NONCE_BS,48) wherein, MSID is the mobile station identification (ID), BSID may be used to ensure different permutation per BSID;

NONCE_BS is the NONCE of the base station and

DOT16 KDF is a key derivation hash function to derive one or more security keys from the MSID, BSID and NONCE_BS.

According to an exemplary embodiment of the invention, NONCE_BS may be used to get different permutation every time the MS connects to the same BS so the permutation will not be tractable. The MSID* may be freshly derived according to BS_NONCE in order to ensure at the BS, the location privacy of the MS.

Furthermore, computing module 175 may compute security keys from MSID* according to Security_keys=DOT16 KDF(Parentkey,MSID*|XXX|YYY|,size), wherein, Parentkey is the parent key from which the keys may be derived;

XXX is more parameters for a specific key such as, for example BSID;

YYY is a generic string which is defined per key;

and size is the size of the key.

According to exemplary embodiments of the invention the security key in YYY may include Pairwise Master Key (PMK), Authorization Keys (AK), Transport Encryption Keys (TEK) or the like. For example, The PMK derivation may be done as follows:

PMK=Dot16 KDF (MSK, NONCE_MS|NONCE_BS|"PMK",160).

Where:
NONCE_MS—a random number generated by MS and send to the BS during key agreement.
NONCE_BS—a random number generated by BS and send to MS during key agreement.

AK may be derived from PMK and may belong to a pair of MS and BS, if desired. For example, the AK derivation may be performed as follows:

AK=Dot16 KDF (PMK, MSID*|BSID|CMAC_KEY_COUNT|"AK", 160)

Where:
MSID*—a permutation of MSID (i.e. AMS MAC address) sent by MS to BS during key agreement, this may be used to bind the key to the MSID.
CMAC_KEY_COUNT—a counter which is used to ensure different AKs for the same BS-MS pairs across handovers.

CMAC keys may be derived from AK and may be used for message authentication in at least some of the control messages. For example, in WiMAX, there may be two CMAC keys, one used for UL and one for DL, if desired. CMAC keys derivation is done:
CMAC_KEY_U| CMAC_KEY_D=Dot16 KDF (AK, "CMAC_KEYS", 256).
Each key is 128 bit in size. According to this example, the keys may be derived every time a new AK is derived.

TEK derivation keys derivation may be done as follows:
$TEK_i$=Dot16 KDF (AK, SAID |COUNTER_TEK=i|"TEK", 128), wherein, SAID is the Security Association IDentifier (SAID) that the TEK may belong to. TEK is the transport encryption key used to encrypt data. In some exemplary embodiments, the TEK lifetime is identical to AK lifetime.

Although the scope of the present invention is not limited to this exemplary embodiment of the invention, processor 170, for example a MAC processor, may generate a second message. For example, the second message may include a mobile station NONCE, the base station random NONCE and a first Integrity Check Value (ICV) for example Cipher-based Message Authentication Code (CMAC) key, if desired.

According to one embodiment, modulator 180 may modulate the second message according to an OFDMA modulation scheme. According to another embodiment of the invention, modulator 180 may modulate the second message according to according to a single carrier frequency division multiple access (SC-FDMA) modulation scheme, if desired.

Although the scope of the present invention is not limited to this example, BS 110 may operate as follows. At least one of MIMO 150 transmitters (e.g. TX 154) may send, using antennas 156, the first message and third message to a MS 160. At least one of MIMO 150 receivers (e.g., RX 152) may receiver the second message and the fourth message in a secure link, if desired. Computing module 125 may compute plurality of security keys may verify the first ICV of the second message. Computing module 125 may compute said plurality of security keys from said MSID* according to Security_keys=DOT16KDF(Parentkey,MSID* |XXX|YYY|,size), wherein,
Parentkey is the parent key from which the keys may be derived;
XXX is more parameters for a specific key such as, for example BSID;
YYY is a generic string which is defined per key;
and size is the size of the key.

Furthermore, computing module 125 may compute a permutation of the mobile station ID (MSID**) according to:
MSID**=DOT16 KDF(MSID|BSID|NONCE_BS,48) wherein,
MSID is the mobile station identification (ID),
BSID is the base station ID,
NONCE_BS is the NONCE of the base station and
DOT16KDF is a key derivation hash function to derive one or more security keys from the MSID, BSID and NONCE_BS. Comparator 127 may compare calculated MSID** with the MSID* and may establish said secure link based on the comparison, if desired.

Figure 2:
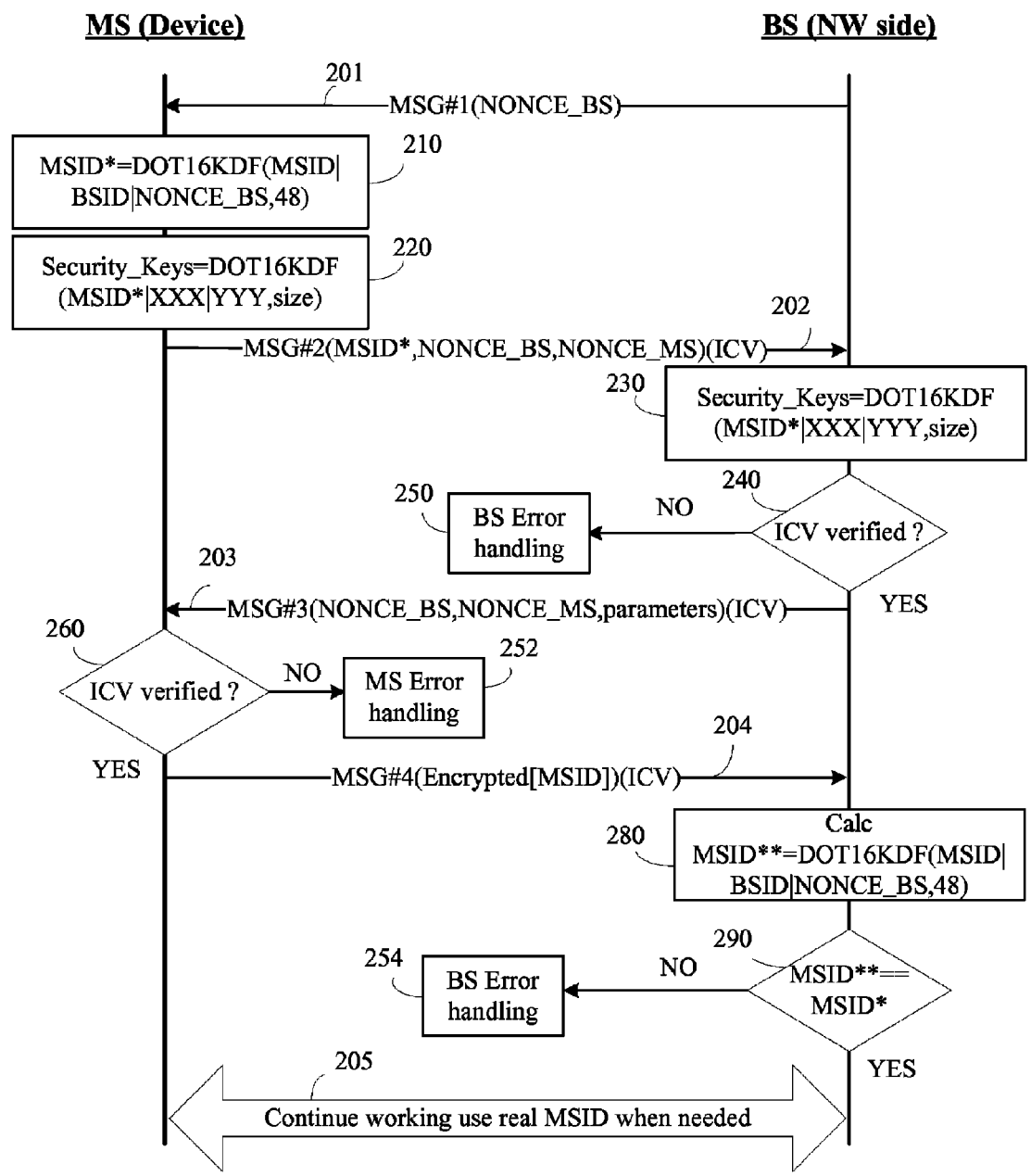
FIG. 2 is an illustration of a flowchart of a method of security key agreement over an air link of a wireless communication system according to an exemplary embodiment of the invention.

Turning to FIG. 2, an illustration of a flowchart of a method of security keys agreement over an air link of a wireless communication system in a secure manner according to an exemplary embodiment of the invention is shown.

An embodiment of the method may start by BS (e.g., BS 110) sending a first message to MS (e.g., MS 160) as is shown with arrow line 201. The first message may include a random NONCE of the BS (e.g., NONCE_BS), if desired.

The MS may received the first message and may calculate a permutation of a mobile station identification (MSID*). The calculation of MSID* may be done according to MSID*=DOT16KDF(MSID|BSID|NONCE_BS,48) (text block 210). The MS may calculate the security keys according to Security_Keys=DOT16KDF (MSID*|XXX|YYY|size) (text block 220) and may store them in a memory, for example memory 180, if desired.

According to this example method, the MS may send a second message over the air to the BS (arrow line 202). The second message may include the MSID*, NONCE_BS, NONCE_MS and a first integrity check value (ICV). The BS may receive the second message and may calculate the security key based on MSID* and according to Security_Keys=DOT16KDF(MSID*|XXX|YYY|size) (text block 230). The BS may store the security keys in a memory, for example memory 130, if desired.

The BS may calculate an ICV of the message and may verify the calculated ICV with the ICV of the received message (diamond 240). The BS may report an error handling if the ICV of the received message do not match the calculated ICV (text block 250). Otherwise, the BS may send a third message over the air to the mobile station (arrow 203). The third message may include the mobile station NONCE, the base station random NONCE and a third message ICV, although the scope of the present invention is not limited in this respect.

The MS may receive the third message and may verify the second message ICV (diamond 260). If the second message ICV does not match the received ICV the MS may report error handling (text block 252). If the received ICV has been verified, the MS may send in a secure link over the air a fourth message (arrow 204). The fourth message may an encrypted the real MS ID, if desired.

The BS may receive the fourth message and may re-calculate the permutation of the MS ID (MSID) according to: MSID=DOT16KDF(MSID|BSID|NONCE_BS,48) (text block 280). The BS may compare the calculated MSID** with the MSID* (diamond 290) and if it matches the BS may establish a secure air link with the MS with the real MSID (arrow 205). Otherwise the BS may report error handling (text block 254), although the scope of the present invention is not limited in this respect.

Although the scope of the present invention is not limited in this respect, once keys are established, the MS may send the real MSID to the BS, encrypted by one of the derived keys and/or as a portion of encrypted message, if desired. Thus, the real MSID may not expose the mapping between real MSID and an air link resource allocation ID such as, for example a CID as is defined in IEEE 802.16e and/or a Station-ID and/or a Flow ID as is defined in IEEE 802.16m, may be hidden. From that point on the true MSID is known to the network and the BS (for example, the current serving BS and/or other BSs belonging to the same authenticator). The BS and/or the MS may calculate MSID* itself whenever there is a need to derive new keys like handover when BSID changes so new keys may be established on both sides (MS and handover target BS) which are bound to the MSID through MSID* without the need to transfer MSID or MSID* over the air again.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of key agreement over an air link of a wireless communication system, the method comprising:
   at a mobile station, receiving a first message from a base station, including a random NONCE wherein said random NONCE is a number or bit string used only once in a message for a security purpose;
   computing a permutation of a mobile station identification (MSID*), wherein the permutation is computed using said random NONCE;
   computing security keys according to:
      Security keys=DOT16KDF(Parentkey, MSID*|XXX|YYY|,size), wherein,
      Parentkey is the parent key from which the keys are derived;
      XXX is more parameters for a specific key such as, for example BSID;
      YYY is a generic string which is defined per key;
      and size is the size of the key;
   sending a second message including a mobile station random NONCE, the base station random NONCE and a first integrity check value (ICV);
   receiving at said mobile station a third message including a mobile station NONCE, the base station random NONCE and a second ICV if the base station verified the first ICV;
   verifying the second ICV; and
   sending a fourth message including mobile station identification in a secure link.

2. The method of claim 1, wherein computing said permutation of said mobile station identification comprises:
   computing said MSID* according to
   MSID*=DOT16KDF(MSID|BSID|NONCE_BS,48)
   wherein,
   MSID is the mobile station identification (ID),
   BSID is the base station ID,
   NONCE_BS is the random NONCE of the base station and
   DOT16KDF is a key derivation function to create a hashed permutation from the MSID, BSID and NONCE_BS.

3. A method of key agreement over an air link of a wireless communication system, the method comprising:
   at a base station, sending a first message to a mobile station, including a first random NONCE wherein said random NONCE is a number or bit string used only once in a lifetime cycle of a key for a security purpose;
   receiving a second message including a mobile station permutated identification (MSID*), a mobile station random NONCE, the base station random NONCE and a first integrity check value (ICV), wherein the permutation is computed using said first random NONCE;
   computing a plurality of security keys and verifying the first ICV, wherein computing said plurality of security keys comprises:
      Security keys=DOT16KDF(Parentkey, MSID*|XXX|YYY|,size), wherein,
      Parentkey is the parent key from which the keys are derived;
      XXX is more parameters for a specific key such as, for example BSID;
      YYY is a generic string which is defined per key;
      and size is of the key;
   sending a third message including said random NONCE of the base station, a random NONCE of the mobile station and a second ICV;
   receiving a fourth message including a mobile station identification in a secure link; and
   comparing calculated MSID** with the MSID* and establishing secure link based on the comparison.

4. The method of claim 3, comprising:
   computing another permutation of the mobile station ID (MSID) according to MSID=DOT16KDF(MSID|BSID|NONCE_BS,48)
   wherein,
   MSID is the mobile station identification (ID),
   BSID is the base station ID,
   NONCE_BS is the NONCE of the base station and
   DOT16KDF is a key derivation function to derive one or more security keys material from the MSID, BSID and NONCE_BS.

5. A mobile station comprising:
   a receiver to receive a first message from a base station, including a random NONCE wherein said random NONCE is a number or bit string used only once in a lifetime cycle of a key for a security purpose;
   a computing module to compute a permutation of a mobile station identification (MSID*), wherein the permutation is computed using said random NONCE, and wherein the computing module is to compute security keys from MSID* and according to:
      Security Keys=DOT16KDF(Parentkey, MSID*|XXX|YYY|size) wherein,
      Parentkey is the parent key from which the keys are derived;
      XXX is more parameters for a specific key such as, for example BSID;
      YYY is a generic string which is defined per key;
      and size is of the key; and
   a transmitter to send a second message including a mobile station random NONCE, the base station random NONCE and a first integrity check value (ICV) and to send a fourth message a mobile station identification in a secure link after receiving a third message including a mobile station NONCE, the base station random NONCE and a second ICV.

6. The mobile station of claim 5, wherein the computing module is to compute said MSID * according to MSID*=DOT16KDF(MSID|BSID|NONCE_BS,48)
   wherein,
   MSID is the mobile station identification (ID),
   BSID is the base station ID,
   NONCE_BS is the NONCE of the base station and
   DOT16KDF is a key derivation function to derive one or more security keys from the MSID, BSID and NONCE_BS.

7. The mobile station of claim 5 comprising:
   a multiple input multiple output (MIMO) transmitters receivers system operably coupled to a plurality of antennas wherein said MIMO transmitters receivers system includes at least said transmitter and at least said receiver.

8. The mobile station of claim 5 comprising:
a modulator to modulate the first message and the third message according to an Orthogonal Frequency Division Multiple Access (OFDMA) modulation scheme; and
a demodulator to demodulate the second and the fourth message according to said OFDMA modulation scheme.

9. The mobile station of claim 5 comprising:
a modulator to modulate the first message and the third message according to a single carrier frequency division multiple access (SC-FDMA) modulation scheme; and
a demodulator to demodulate the second and the fourth message according to an Orthogonal Frequency Division Multiple Access (OFDMA) modulation scheme.

10. A base station comprising:
a transmitter to send a first message to a mobile station, including a first random NONCE wherein said random NONCE is a number or bit string used only once in a lifetime of a key for a security purpose and to send a third message including said random NONCE of the base station, a random NONCE of the mobile station and a second ICV;
a receiver to receive a second message including a mobile station permutated identification (MSID*), wherein the mobile station permutated identification is computed using said first random NONCE, a mobile station random NONCE, the base station random NONCE and a first integrity check value (ICV) and a fourth message including a mobile station identification in a secure link;
a computing module to compute plurality of security keys and to verify the first ICV of the second message, wherein the computing module is to compute said plurality of security keys from said MSID* according to:
Security_keys=DOT16KDF(Parentkey, MSID*|XXX|YYY|,size), wherein,
Parentkey is the parent key from which the keys are derived;
XXX is more parameters for a specific key such as, for example BSID;
YYY is a generic string which is defined per key;
and size is the key size; and
a comparator to compare calculated MSID** with the MSID* and to establish said secure link based on the comparison.

11. The base station of claim 10 wherein the computing module is to compute another permutation of the mobile station ID (MSID) according to MSID=DOT16KDF (MSID|BSID|NONCE_BS,48)
wherein,
MSID is the mobile station identification (ID),
BSID is the base station ID,
NONCE_BS is the NONCE of the base station and
DOT16KDF is a key derivation function to derive one or more security keys materials from the MSID, BSID and NONCE_BS.

12. The base station of claim 10 comprising:
a multiple input multiple output (MIMO) transmitters receivers system operably coupled to a plurality of antennas wherein said MIMO transmitters receivers system includes at least said transmitter and at least said receiver.

13. The base station of claim 10 comprising:
a modulator to modulate the first message and the third message according to an Orthogonal Frequency Division Multiple Access (OFDMA) modulation scheme; and
a demodulator to demodulate the second and the fourth message according to said OFDMA modulation scheme.

14. The base station of claim 10 comprising:
a modulator to modulate the first message and the third message according to an Orthogonal Frequency Division Multiple Access (OFDMA) modulation scheme; and
a demodulator to demodulate the second and the fourth message according to a single carrier frequency division multiple access (SC-FDMA) modulation scheme.

15. A wireless communication system comprising:
a mobile station and a base station wherein the mobile station comprises:
a receiver to receive a first message from a base station, said first message including a random NONCE, wherein said random NONCE is a number or bit string used only once in a lifetime cycle of a key for a security purpose;
a computing module to compute a permutation of a mobile station identification (MSID*), wherein the permutation is computed using said random NONCE, and wherein the computing module of the mobile station is to compute security keys from MSID* and according to Security_keys=DOT16KDF(Parentkey, MSID*|XXX|YYY|,size), wherein,
Parentkey is the parent key from which the keys are derived;
XXX is more parameters for a specific key such as, for example BSID;
YYY is a generic string which is defined per key;
and size is of the key; and
a transmitter to send a second message, said second message including a mobile station random NONCE, the base station random NONCE and a first integrity check value (ICV) and to send a fourth message, said fourth message including a mobile station identification, in a secure link after receiving a third message including a mobile station NONCE, the base station random NONCE and a second ICV; and
the base station comprises:
a transmitter to send said first message and the third message to said mobile station;
a receiver to receive said second message said fourth message;
a computing module to compute a plurality of security keys and to verify the first ICV of the second message; and
a comparator to compare calculated MSID** with the MSID* and to establish said secure link based on the comparison.

16. The wireless communication system of claim 15 wherein the computing module of the mobile station is to calculate said MSID* according to MSID*=DOT16KDF (MSID|BSID|NONCE_BS,48)
wherein,
MSID is the mobile station identification (ID),
BSID is the base station ID,
NONCE_BS is the NONCE of the base station and
DOT16KDF is a key derivation function to derive one or more security keys materials from the MSID, BSID and NONCE_BS.

17. The wireless communication system of claim 15, the mobile station further comprising:
a multiple input multiple output (MIMO) transmitters receivers system operably coupled to a plurality of antennas wherein said MIMO transmitters receivers system includes at least said transmitter and at least said receiver.

18. The wireless communication system of claim 15, the mobile station further comprising:
a modulator to modulate the first message and the third message according to an Orthogonal Frequency Division Multiple Access (OFDMA) modulation scheme; and
a demodulator to demodulate the second and the fourth message according to said OFDMA modulation scheme.

19. The wireless communication system of claim 15, the mobile station further comprising:
a modulator to modulate the first message and the third message according to a single carrier frequency division multiple access (SC-FDMA) modulation scheme; and
a demodulator to demodulate the second and the fourth message according to an Orthogonal Frequency Division Multiple Access (OFDMA) modulation scheme.

20. The wireless communication system of claim 15 wherein the computing module of the base station is to compute said plurality of security keys from said MSID* according to Security_keys=DOT16KDF(Parentkey, MSID*|XXX|YYY|,size), wherein,
Parentkey is the parent key from which the keys are derived;
XXX is more parameters for a specific key such as, for example BSID;
YYY is a generic string which is defined per key;
and size is of the key.

21. The wireless communication system of claim 15 wherein the computing module of the base station to compute another of the mobile station ID (MSID) according to MSID=DOT16KDF(MSID|BSID|NONCE_BS,48) wherein,
MSID* is the mobile station identification (ID),
BSID is the base station ID,
NONCE_BS is the NONCE of the base station and
DOT16KDF is a key derivation function to derive one or more security keys from the MSID, BSID and NONCE_BS.

22. The wireless communication system of claim 15, the base station comprising:
a multiple input multiple output (MIMO) transmitters receivers system operably coupled to a plurality of antennas wherein said MIMO transmitters receivers system includes at least said transmitter and at least said receiver.

23. The wireless communication system of claim 15, the base station comprising:
a modulator to modulate the first message and the third message according to an Orthogonal Frequency Division Multiple Access (OFDMA) modulation scheme; and
a demodulator to demodulate the second and the fourth message according to said OFDMA modulation scheme.

24. The wireless communication system of claim 15, the base station comprising:
a modulator to modulate the first message and the third message according to an Orthogonal Frequency Division Multiple Access (OFDMA) modulation scheme; and
a demodulator to demodulate the second and the fourth message according to a single carrier frequency division multiple access (SC-FDMA) modulation scheme.

25. A method of key agreement over an air link of a wireless communication system, the method comprising:
sending from a mobile station to a remote station in an unsecure mode a permutation of a mobile station identification (MSID*), wherein the permutation is computed using a random NONCE;
establishing a secure link between the mobile station and the remote station with a first set of keys derived from said permutation of a mobile station identification (MSID*), wherein the security keys are computed according to
Security_keys=DOT16KDF(Parentkey, MSID*|XXX|YYY|,size), wherein,
Parentkey is the parent key from which the keys are derived;
XXX is more parameters for a specific key such as, for example BSID;
YYY is a generic string which is defined per key;
and size is the size of the key;
sending from the mobile station to the remote station over the established secured link mobile station identification (MSID).

26. The method of claim 25 comprising:
deriving a second set keys based on said MSID; and
communicating over the secure link using the second set of keys.

27. The method of claim 25, wherein calculating said permutation of said mobile station identification comprises:
computing said MSID* according to MSID*=DOT16KDF (MSID|BSID|NONCE_BS, 48)
wherein,
MSID is the mobile station identification (ID),
BSID is the base station ID,
NONCE_BS is the random NONCE of the base station and
DOT16KDF is a key derivation function to create a hashed permutation from the MSID, BSID and NONCE_BS.

* * * * *